(12) United States Patent
Eshet et al.

(10) Patent No.: US 7,974,973 B1
(45) Date of Patent: Jul. 5, 2011

(54) APPLICATION OBJECT TUNING

(75) Inventors: Ehud Eshet, Modiin (IL); Rafi Balbirsky, Tel Aviv (IL); Sigal Gelbart, Hod Hasharon (IL); Ori Rosen, Holon (IL); Ilan Shiber, Ganei Tikva (IL)

(73) Assignee: Precise Software Solutions Inc., Redwood Shores, CA (US)

( * ) Notice: Subject to any disclaimer, the term of this patent is extended or adjusted under 35 U.S.C. 154(b) by 468 days.

(21) Appl. No.: 12/188,179

(22) Filed: Aug. 7, 2008

Related U.S. Application Data

(60) Provisional application No. 61/086,792, filed on Aug. 6, 2008.

(51) Int. Cl.
G06F 17/30 (2006.01)
G06F 7/00 (2006.01)

(52) U.S. Cl. ......... 707/725; 707/673; 707/718; 707/830

(58) Field of Classification Search .................. None
See application file for complete search history.

(56) References Cited

U.S. PATENT DOCUMENTS

| | | | |
|---|---|---|---|
| 6,654,948 B1 * | 11/2003 | Konuru et al. | 717/127 |
| 7,194,451 B2 * | 3/2007 | Chaudhuri et al. | 707/694 |
| 7,673,291 B2 * | 3/2010 | Dias et al. | 717/127 |
| 2005/0065921 A1 * | 3/2005 | Hrle et al. | 707/3 |
| 2005/0187917 A1 * | 8/2005 | Lawande et al. | 707/3 |

* cited by examiner

*Primary Examiner* — Greta L Robinson
*Assistant Examiner* — James J Wilcox
(74) *Attorney, Agent, or Firm* — Mark M. Friedman

(57) ABSTRACT

Apparatus, methods, and computer readable medium for monitoring a database and for determining aggregate I/O wait times (i.e. for a 'target' index or table) associated at least one I/O category selected from a plurality of I/O categories are disclosed herein.

8 Claims, 7 Drawing Sheets

APPLICATION OBJECT TUNING

CROSS-REFERENCE TO RELATED APPLICATIONS

This patent application claims the benefit of U.S. Provisional Patent Application No. 61/086,792 filed Aug. 6, 2008 by the present inventors.

BACKGROUND OF THE INVENTION

1. Field of the Invention

The present invention relates to methods, apparatus and computer-code for acquiring and presenting information describing database performance.

2. Related Art

There is an ongoing need for tools and techniques for improved database tuning.

In particular, there is need for tools and techniques which 'push' the most relevant information about database performance to database administrators (DBAs).

When database statements execute, it is common for tables and/or indexes to be read. At a time that the table or index is being read, the database statement may be forced to 'wait' for a table-read or index-read operation to complete, for 'moving on' to additional operations. In the event that one or more I/O operations are 'too slow' (i.e. because of a poorly defined index or schema and/or because of poor infrastructure such as lack of RAM or a poorly-performing disk or network card), the performance of any given statement, or a group of statements, may suffer.

Unfortunately, it is often difficult to track down the causes of such 'slow I/O' operations.

There is an ongoing need for tools and techniques which help a information does not necessarily allow a DBA to draw the "proper conclusions" as to (i) the cause of excessive wait times; and (ii) how to tune the particular object and/or statements in order to achieve better database performance.

SUMMARY OF EMBODIMENTS

The present inventors note that "not all I/O wait time is created equally"—for example, I/O wait time may be due to index overhead, scanning a majority or an entirety or a table, table I/O after index I/O, index skip scan, index range scan, full index access, etc.

Each type of I/O wait time may be indicative of a different type of deficiency in the database, and may require a different type of remedy.

Embodiments of the present invention provide a tool and technique for quantifying aggregate wait times for various wait time categories, and present to a user an indication of aggregate wait times for each category. The aggregate wait time for a given category (i.e. for a table or index) will, in many cases, be only a 'fraction' of the total I/O wait time for the table or index during a time interval—thus, the aggregate categorized wait time may be only a 'fractional aggregate wait time' for a given time interval.

Embodiments of the present invention relate to apparatus, techniques and computer-readable medium where (i) an estimate of the total wait time associated with multiple index-read operations a given I/O wait time category selected from a plurality of I/O wait time categories is determined for a given or target database index (or table) and (ii) in accordance with this estimated total 'category-specific' wait time (i.e. which is only a 'fraction' of the total wait time which includes wait time of both index-read operations of CATEGORY A and index-read operations of CATEGORY B), information related to database performance may be presented to a user such as a DBA.

In one non-limiting example, a representation of the total or aggregate wait time of one or more categories of wait times is presented to a user (for example, a user may be told that aggregate full index scan took 4 minutes 5 seconds [for example, there may be a plurality of distinct 'aggregate full index scan' operations that this time is the total time summed over the plurality] during a time interval and that table I/O after index I/O took 3 minutes during the time interval).

In some embodiments, the technique is implemented as follows: a plurality of I/O operations are detected for a given 'target' object (an object is a table or an index). Each detected I/O operation is correlated with (i) an 'invoking' or 'triggering' database statement which causes the I/O operation and (ii) an execution plan of the invoking or triggering database statement. The execution plan is analyzed in order to determine what 'type' of I/O causes the detected I/O operation on the object (i.e. index or table). Furthermore, the 'amount' of I/O (i.e. in seconds or milliseconds or any other time unit) for the detected I/O operation or state may be determined, and also correlated with the detected I/O operation or state.

In this manner, it is possible, using a 'relationship' between the 'target' index or table (i.e. the 'target object') and the execution plan of the 'invoking' database statement it is possible (i) to determine the nature of the I/O operation that is carried out on the table or index and (ii) to correlate this information with an amount of I/O wait time associated with accessing the table or index in this manner.

It is now disclosed for the first time a method for displaying information related to performance of a database during a time interval, the method comprising: a) during the time interval, effecting a plurality of index I/O operation or table I/O operation detectings, each index I/O operation or table I/O operation detecting being associated with a respective quantity of wait-time; b) for each index I/O or table I/O operation detecting of the plurality of index I/O or table I/O operation detectings: i) determining an identity of a respective target index or table for the detected index I/O or table I/O; ii) determining an identity and an execution plan of a respective invoking database statement iii) determining a respective database index-execution plan relationship or database table-execution plan relationship between the respective target index and the execution plan of the respective database statement; and iv) categorizing, in accordance with the index-execution plan or table-execution plan relationship, the detected table or index I/O operation into an I/O category selected from a plurality of I/O categories; c) in accordance with i) the wait-time quantities; and ii) the results of the categorization, determining, for a particular category of the plurality of I/O categories, for a given index or table of the database and for the time interval, a fractional aggregate index-I/O or table I/O wait time for the particular category, the fractional aggregate index-I/O or table I/O being only a fraction of a total index IO wait time or table I/O wait time for the given index or table for the time interval; and d) in accordance with the determine fractional aggregate index-read wait time for at least one of the categories, presenting, to a user, a description of performance of the database during the time period.

In some embodiments, the I/O categories are selected from the group consisting of full index scan, index skip scan, index range scan, table I/O after index I/O and full table scan.

In some embodiments, the execution plans are estimated execution plans. In some embodiments, the execution plans real are real execution plans, and the method further comprises: e) monitoring the database during the time intervals to detect one or more real execution plans associated with the invoking database statement.

In some embodiments, i) the method further comprises, for a particular category: e) determining a ratio between (A) the fractional aggregate index or fractional aggregate table I/O wait time for the given index or table and a given category and a (B) total wait time for the given index or table; and ii) the description of the performance of the database during the time period is presented in accordance with the determined ratio.

In some embodiments, the describing of the performance of the database further includes: i) displaying a description of the particular category; and ii) associating the description of the particular category with the description of the determined ratio.

In some embodiments, i) the method is carried out to determine, for each I/O category of the plurality of I/O categories, a respective aggregate I/O time; and ii) the presenting includes presenting, for each I/O category of the plurality of I/O categories, a respective aggregate I/O wait time for said each I/O category; iii) the describing includes presenting descriptions of the I/O categories that are associated with respective ration value It is now disclosed a system for displaying information related to performance of a database during a time interval, the method comprising: A) a performance data-handler operative to: a) during the time interval, effecting a plurality of index I/O operation or table I/O operation detectings, each index I/O operation or table I/O operation detecting being associated with a respective quantity of wait-time; b) for each index I/O or table I/O operation detecting of the plurality of index I/O or table I/O operation detectings: i) determining an identity of a respective target index or table for the detected index I/O or table I/O; ii) determining an identity and an execution plan of a respective invoking database statement; iii) determining a respective database index-execution plan relationship or database table-execution plan relationship between the respective target index and the execution plan of the respective database statement; and iv) categorizing, in accordance with the index-execution plan or table-execution plan relationship, the detected table or index I/O operation into an I/O category selected from a plurality of I/O categories; c) in accordance with: i) the wait-time quantities; and ii) the results of the categorization, determining, for a particular category of the plurality of I/O categories, for a given index or table of the database and for the time interval, a fractional aggregate index-I/O or table I/O wait time for the particular category, the fracional aggregate index—I/O or table I/O being only a fraction of a total index IO wait time or table I/O wait time for the given index or table for the time interval; and B) a performance-data presentation interface operative, in accordance with the determine fractional aggregate index-read wait time for at least one of the categories, to present, to a user, a description of performance of the database during the time period.

These and further embodiments will be apparent from the detailed description and examples that follow.

Figure 1:
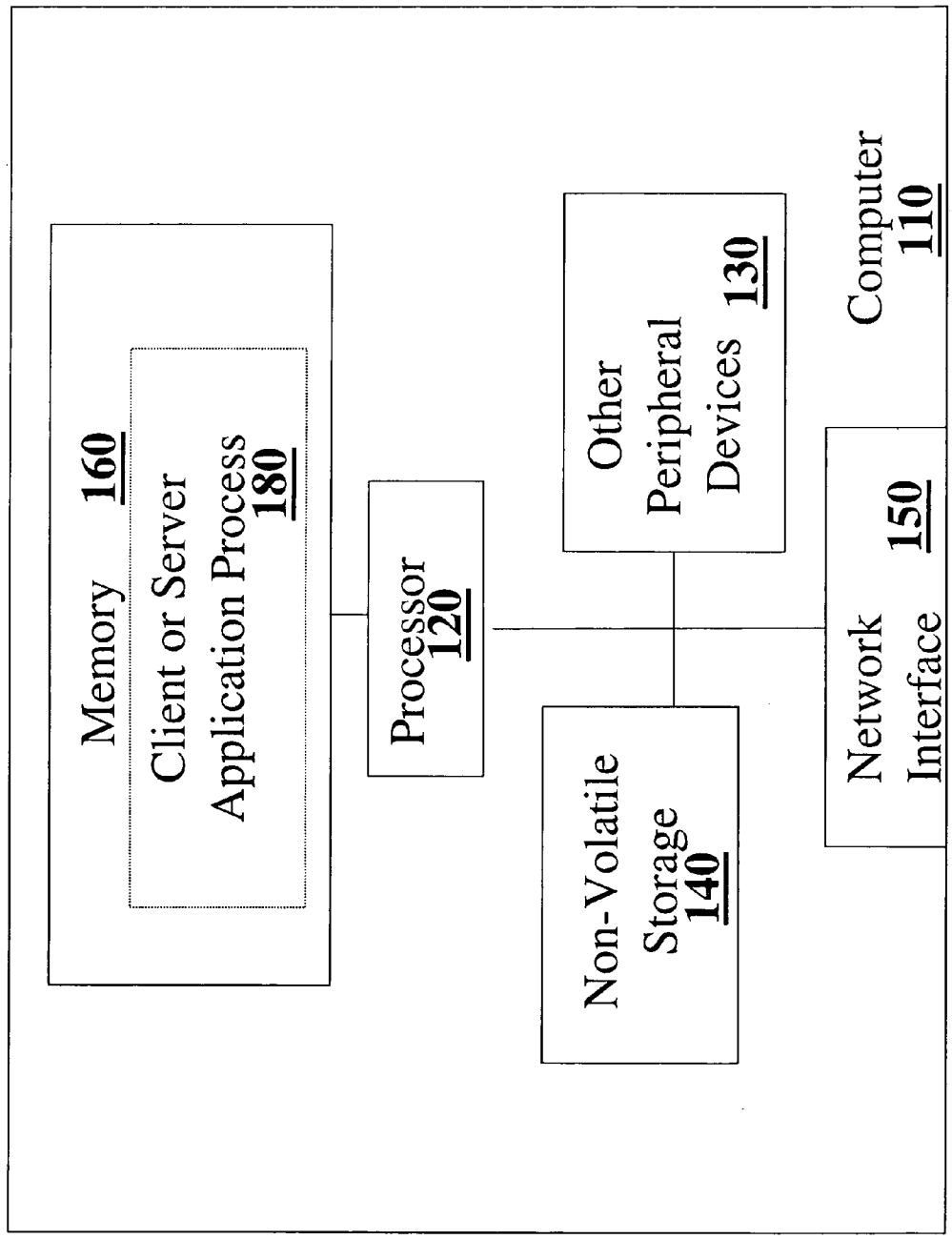
FIG. 1 is a block diagram of a computer in accordance with exemplary embodiments of the present invention.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word may is used in a permissive sense (i.e., meaning having the potential to'), rather than the mandatory sense (i.e. meaning must).

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed system, method and computer-readable code for display information related to database performance in accordance with categorized index or table I/O wait times is necessary to implement the invention as claimed in any particular one of the appended claims. Various elements and features of devices are described to fully enable the invention. It should also be understood that throughout this disclosure, where a process or method is shown or described, some of the steps of the method may be performed in any order or simultaneously, unless it is clear from the context that one step depends on another being performed first. The general principles described herein may be applied to other embodiments and applications without departing from the scope of the invention. Thus, the present invention is not to be limited to the embodiments shown, but is to be accorded the widest scope consistent with the principles and features described herein.

In one embodiment, a database performance-analysis tool (i.e., an apparatus, a computer-implemented method and/or computer code for monitoring a database) presents data descriptive of performance of a database (e.g. a relational database) in accordance with an aggregate wait time of index-read operations that are associated with a given defined 'I/O operation type' category.

Some exemplary categories may include I/O wait time may be due to index overhead, scanning a majority or an entirety or a table, table I/O after index I/O, index skip scan, index range scan, full index access.

Towards this end, it may be useful to monitor the relational database over a time interval by effecting a plurality of detectings of I/O on a table or index at different times during the time interval. In one non-limiting example, "system data" of the database is read repeatedly (e.g. by reading 'system memory' or one or more 'system tables' of the database)—for example, at least once a second or at least once every few seconds. Each time the system data is read, it is determined:

(i) if a database statement is 'waiting' for an I/O operation that is carried out to a table or an index; (ii) the circumstances of the I/O operation.

The presently disclosed apparatus and method may be implemented using any combination of computer-executable code modules and hardware. In one embodiment, the presently disclosed apparatus is implemented using a single computer device or a plurality of computer devices in communication with each other.

A Discussion of FIG. 1

FIG. 1 illustrates one embodiment of a computer 110 including a processor 120. Processor 120 is shown coupled to a memory 160, a non-volatile storage 140, a video display device 135, a mouse 145, a keyboard 155, and a network interface 150 such as a network interface card. It is appreciated that not every element is required in every embodiment.

Processor 120 may be configured to execute instructions and to process data according to a particular instruction set architecture (ISA). In one embodiment, processor 120 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 160 may comprise any suitable type of system memory as described above, such as FB-DIMM, DDR/DDR2 SDRAM, or RDRAM☐, for example. Memory 160 may include multiple discrete banks of memory. Also, in some embodiments memory 160 may include multiple different types of memory.

In some embodiments, computer 110 may include more than one instance of the devices shown, such as more than one processor 120, for example. In various embodiments, computer 110 may be configured as a rack-mountable server system, a standalone system, or in any other suitable form factor. In different embodiments, computer 110 may be configured as a client system or as a server system.

Figure 3:
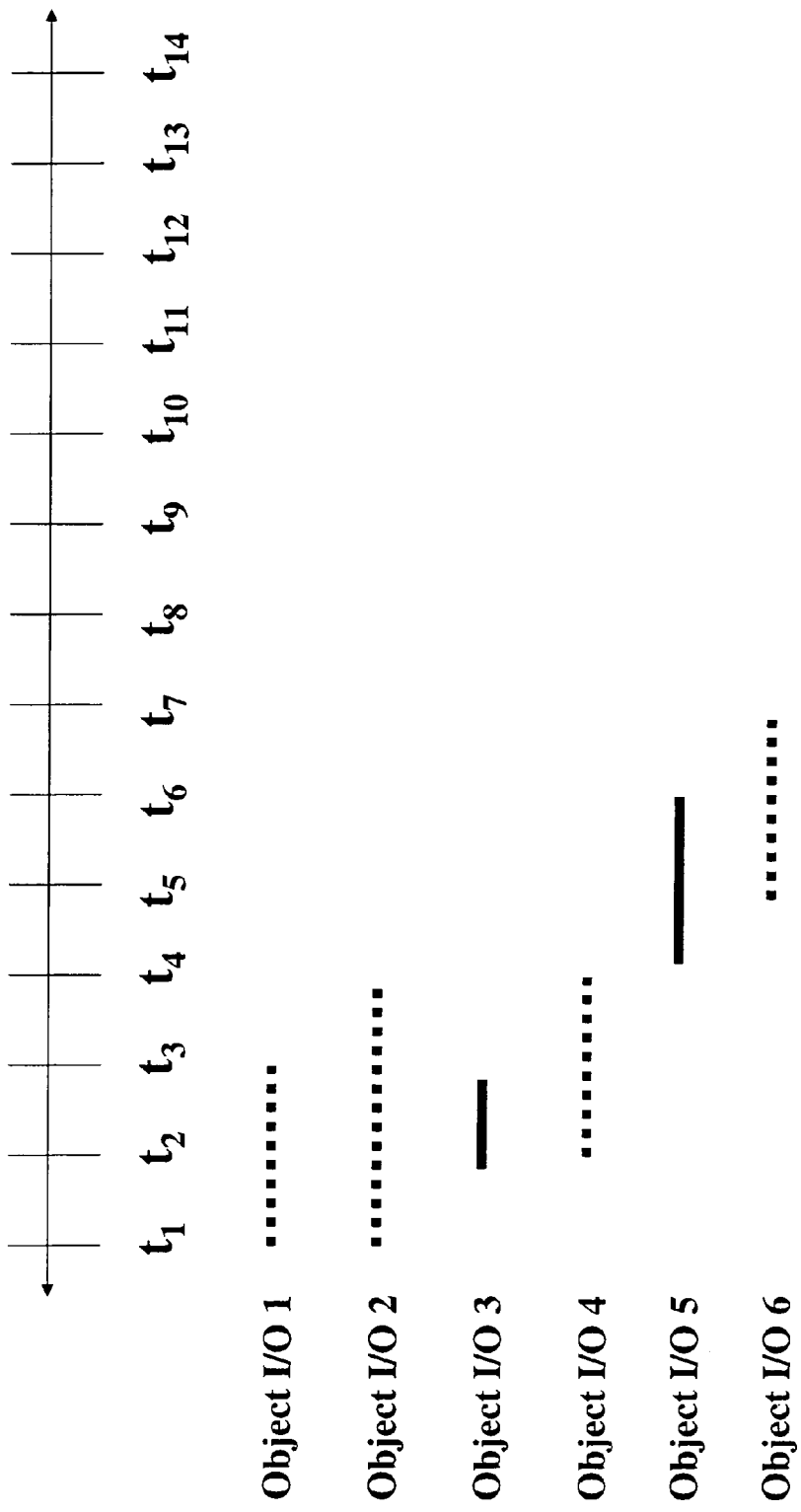
FIG. 3 describes an example where read operations of CATEGORY A and of CATEGORY B are carried out to a table or index by executing database statements of the database.
Figure 3:
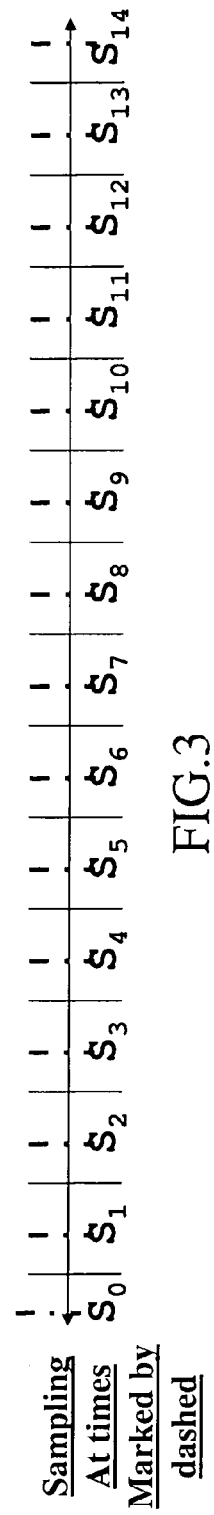

In one embodiment, processor 120 may be configured to run operating system software such as Microsoft Windows, IBM AIX or Sun Microsystems Solaris. Operating system software may in turn provide an environment in which processor 120 may execute additional software modules in the form of applications, programs, or processes designed to perform specific functions. Running operating system software or software modules may comprise executing instructions that are stored in memory 160. As shown in FIG. 3, a client or server application process resides in the memory 160.

Software modules that may be executed by processor 120 may include, in one embodiment, client/server software such as a web server or a web browser. Alternatively, or in addition, processor 120 may execute software modules comprising network management software, office productivity tools, e-mail programs, etc. Many other types of software may be executed such as a virtual machine runtime environment, a database, an application server, and diagnostic, monitoring, profiling, or analysis software. Furthermore, while executing such software, processor 120 may retrieve data from and store data in non-volatile storage 140 or in memory 160.

As shown in FIG. 1, a client or server application process 180 to be performance-monitored resides in memory 160. In one embodiment, one or more software processes may perform the function of profiling other software processes (e.g. process 180) during operation, gathering and storing data indicative of the operation of one or more of the other software processes. The performance-monitored software application may reside on computer 110. Alternatively or additionally, the performance-monitored software application may reside on a different computer. These monitored application (i.e. database management system) may reside on a single computer 110 or may be a distributed or clustered application residing on a plurality of computers 110.

DEFINITIONS

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

In the present disclosure, an 'execution plan' or a 'query plan' or a 'query execution plan' is a set of steps used to access information in a SQL relational database. Typically, each execution plan is associated with a different 'cost' indicative of a service time and/or amount of resources required to effect the SQL database query using the given plan. Thus, most SQL relational database include a query optimization engine or 'query optimizer' that, when handling an SQL query, may evaluate the cost of one or more execution plans and select the optimal execution plan.

Some embodiments relate to a "database index-execution plan" or a "database table-execution plan" relationship between a 'target' index I/O operation (or table I/O operation) at a certain time and an execution plan of the 'invoking' or 'triggering' database statement whose execution at a given time requires reading the 'target index. The "database index-execution plan" relationship may indicate the 'type' of index I/O operation or table I/O operation provided by the execution plan (i.e. by one or more steps of the plan)—for example, whether the target index reading is a 'range scan' or a 'unique scan' or a 'full-index scan,' if the table access is full table scan, etc.

For the present disclosure, execution of a database statement may entail performing I/O operations one or more database indexes or tables. At the time the index is being read, the database statement may require that the I/O operation finishes, and may thus 'wait' for the I/O operation on the index or table. Thus, the time that the database statement 'waits' for the I/O operation on the index or table is 'wait time' associated with an 'index read operation.'

A 'target' index (or table) is an index (or table) for which a given database statement is 'waiting.'

During a time interval, a "given" database index or table may be I/O-accessed multiple times, and may be "involved" with multiple distinct index I/O or table I/O operations. The aggregate index I/O wait time or table I/O wait time is the total wait time (i.e. the total amount of time that database statement(s), whose execution causes the table I/O operation, must wait for the operation on the 'given database index' or 'given database table' to complete during execution, summed over all of the index I/O or table I/O operations.

Figure 2:
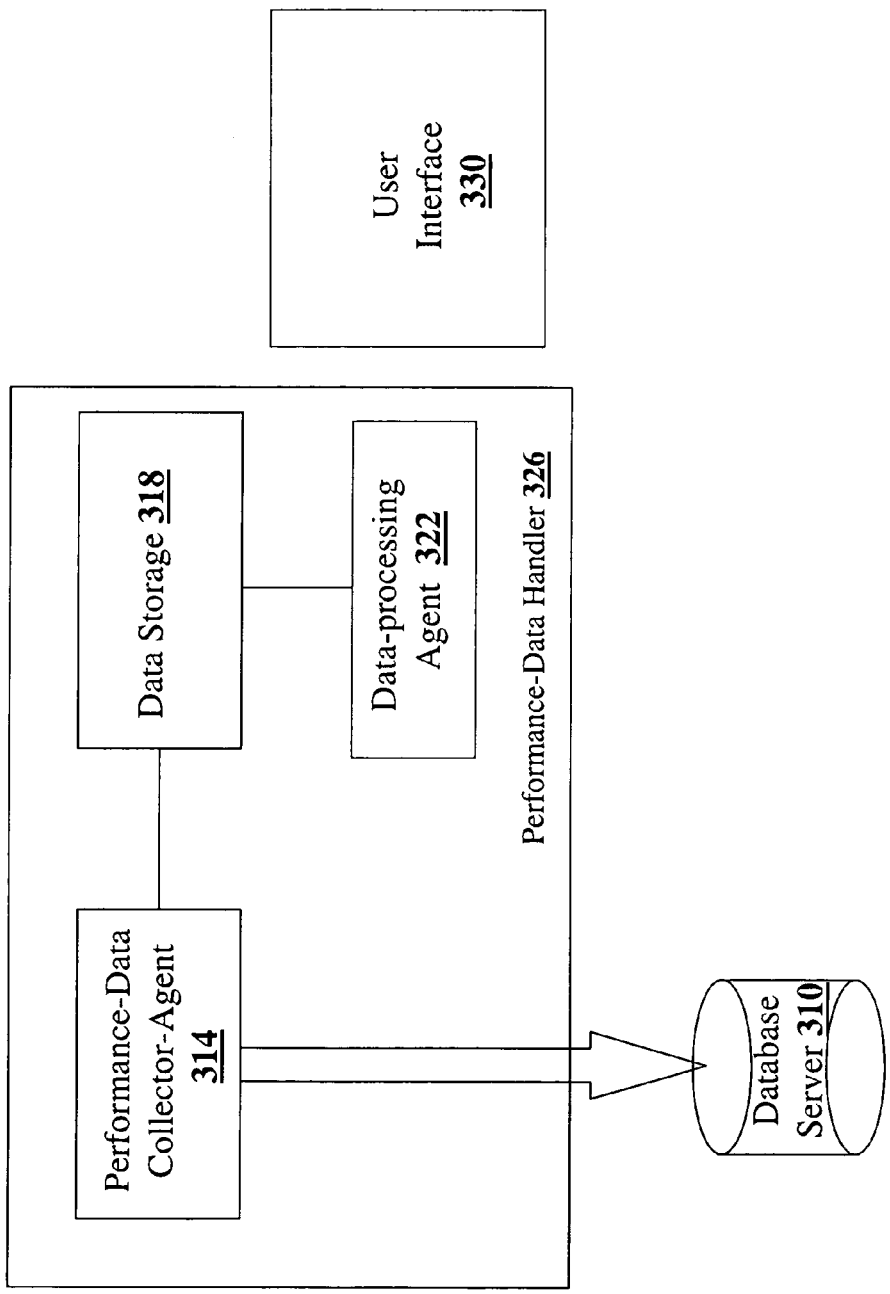
FIG. 2 is a block diagram of a system for performance-monitoring a database in accordance with some embodiments.

Discussion of FIG. 2

FIG. 2 provides a block diagram of an exemplary architecture for (a) collecting performance data for an executing configurable database 310 including data describing whether or not a "index-read" operation is occurring at a given 'sample' time and/or an identity of a database index which is "involved" with the index-read operation; (b) storing the collected performance data in a data storage 318; (c) analyzing or processing the data, using data-processing agent 322 which may 'process' stored information about database performance.

In one example, data-processing agent may categorize detected index-reads (e.g. in accordance with an execution plan of a database statement which triggered the index read and/or in accordance with whether or not the index read is performance accelerating or associated with index maintenance), and determine from information about when given "index-read" operations take place (and the category or type of index read) a fractional aggregate index-read wait time (i.e. for any 'category' and/or a total aggregate index-read wait time) for a given database index.

It is appreciated the data storage 318 may store data other than the performance data. The data of the data storage 318 may be accessible by any number of executing processes on a single computer 110 or from multiple computers. Furthermore, data storage 318 may be implemented in any combination of volatile memory 160 (including but not limited to RAM) and non-volatile storage 140 (including but not limited to magnetic storage and flash storage).

Exemplary routines for data collection, data analysis, and presenting performance data are discussed below with reference to FIGS. 4-6.

As with any embodiment of the present invention, the system of FIG. 2 as a whole as well as each individual component may all reside on a single computer 110 or may be 'distributed' among more than one computer 110 in communication via a local or wide-area computer network.

Database server 310 or database management system is typically a relational database, including but not limited to Oracle®, SQLServer®, Sybase®, IBM DB2®, and MySQL®.

As used herein, an 'agent' (for example, collector agent 314 or data storage agent 326) refers to computer code (i.e. stored on a computer-readable medium) operative to carry out one or more tasks. The computer code may be implemented in any single computer language or combination of computer languages, including but not limited to machine-readable code (for example, machine language or assembler), so-called intermediate code (for example, Java byte code or .NET), compiled code (for example, compiled C++ code), and human readable code (for example, query language code such as SQL; for example, scripting code). The agent may be deployed in any number of process spaces, and on any number of computers 110 (for example, residing on a single computer 110, or the agent may be 'distributed' among a plurality of machines).

A 'collector agent' is operative to collect performance data an on ongoing basis—i.e. by collecting a sample of performance data at different times (i.e. repeatedly collecting different samples of performance data). In one non-limiting example, the collector agent includes one or more computer-executable code modules stored on a storage medium.

A "database-processing agent" is operative to process or analyze performance data. In one non-limiting example, the data-processing agent includes one or more computer-executable code modules stored on a storage medium.

In the example of FIG. 2, the system provides a user interface 330 (for example, a graphic user interface (GUI)) for presenting (i.e. displaying, for example, on a computer screen) performance data in accordance with at least one of any output of performance-data handler 326. User interface 330 (i.e. which is a performance-data presentation interface) and performance-data handler 326 may be implemented in any combination of hardware and/or executable code modules.

Performance-data collector agent 314, data storage 318, and data-processing agent 322 are collectively referred to as a performance-data handler 326.

Discussion of FIG. 3

Before describing various flowcharts of routines for estimating aggregate wait times of categorized I/O operations on tables or indexes (i.e. total and/or of a certain category such as index-overhead read operations), an exemplary simplified non-limiting use case is described.

In the example of FIG. 3, a simplified case where there are only two categories of I/O operations [CATEGORY A and CATEGORY B] is presented. It is appreciated that this may be generalized to cases where there are three or more categories of I/O. Index (or table) I/O operations that are of CATEGORY A are illustrated as broken lines—these are index-reads 1, 2, 4 and 6. Object I/O operations that are category B are illustrated as solid lines—these are index-reads 3 and 5.

In the present disclosure, the term "Object" refers to a table or an index.

The 'wait-time' associated with index-read 1 is $t3-t1$.
The 'wait-time' associated with index-read 2 is $t4-t1$.
The 'wait-time' associated with index-read 3 is $t3-t2$.
The 'wait-time' associated with index-read 4 is $t4-t2$.
The 'wait-time' associated with index-read 5 is $t6-t4$.
The 'wait-time' associated with index-read 6 is $t7-t5$.

Thus, in the example of FIG. 3: the total aggregate wait time for the 'given index' is $2*t3+t4+t6+t7-2*t1-2*t2-t5$.

A first portion or fraction (i.e. less than 100% and more than 0%) of the aggregate index-read of the total aggregate wait time is attributable to CATEGORY A I/O operations—the aggregate read time of this first portion or fraction (i.e. see the broken lines) is $t1+2*t4+t7-2*t1-t2-t5$. This may be referred to as a 'fractional aggregate index-read time' because it is only a fraction of the total index-read wait time, and is associated with only a proper sub-set of all index-read operations (i.e. index-read operations 1, 2, 4 and 6 which are performance-accelerating).

A second portion or fraction (i.e. less than 100% and more than 0%) of the aggregate index-read of the total aggregate wait time is attributable to CATEGORY B I/O operations—the aggregate read time of this second portion or fraction (i.e. see the solid lines) is $t3+t6-t2-t4$. This also may be referred to as a 'fractional aggregate index-read time' because it is only a fraction of the total index-read wait time, and is associated with only a proper sub-set of all index-read operations (i.e. index-read operations 3 and 5 which index-maintenance).

Figure 4:
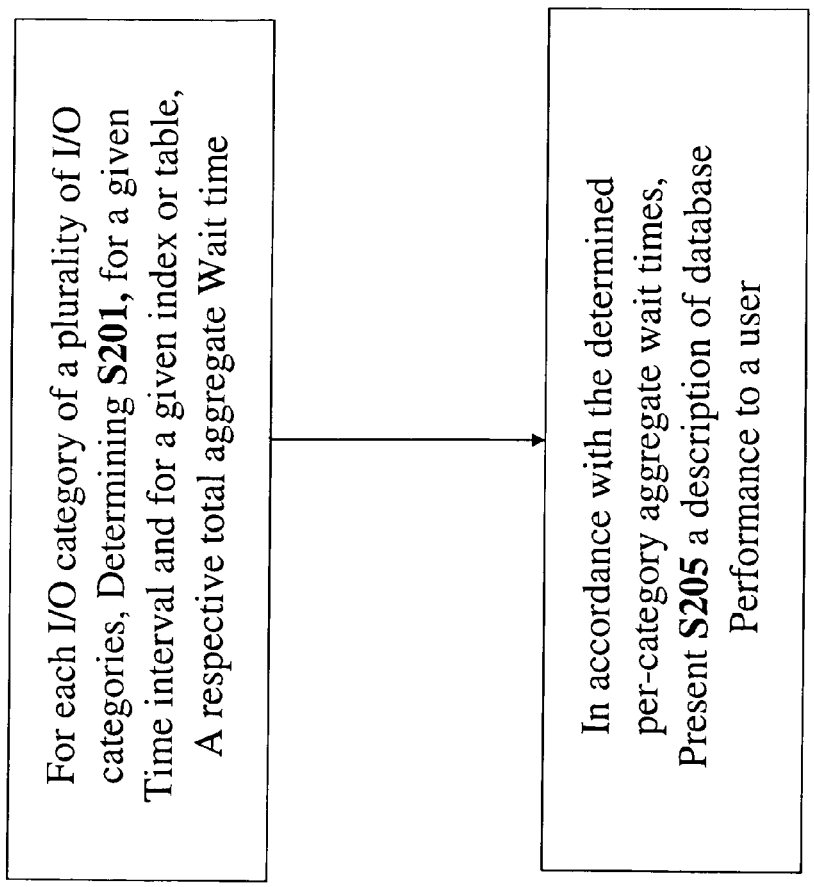
FIGS. 4, 6, 7 are flow charts of routines for performance-monitoring a database in accordance with some embodiments.

Discussion of FIG. 4

FIG. 4 presents a flow chart describing an exemplary routine for presenting a description of database performance data in accordance with some embodiments of the present invention.

In step S201, wait time data (for example, wait relating to aggregate wait times of "index-read" operations during a time interval—i.e. either the entire wait time or a fractional aggregate wait time based on a type or category of index-read—for example, an aggregate 'index-maintenance' wait time) is collected S201 for at least one index (i.e. on a per-index basis).

In step S205. a description of database performance (i.e. one or more aspects of database performance) is presented to a user in accordance with the fractional 'index-read' aggregate wait time (e.g. index-overhead) data obtained in step S201.

Figure 5:
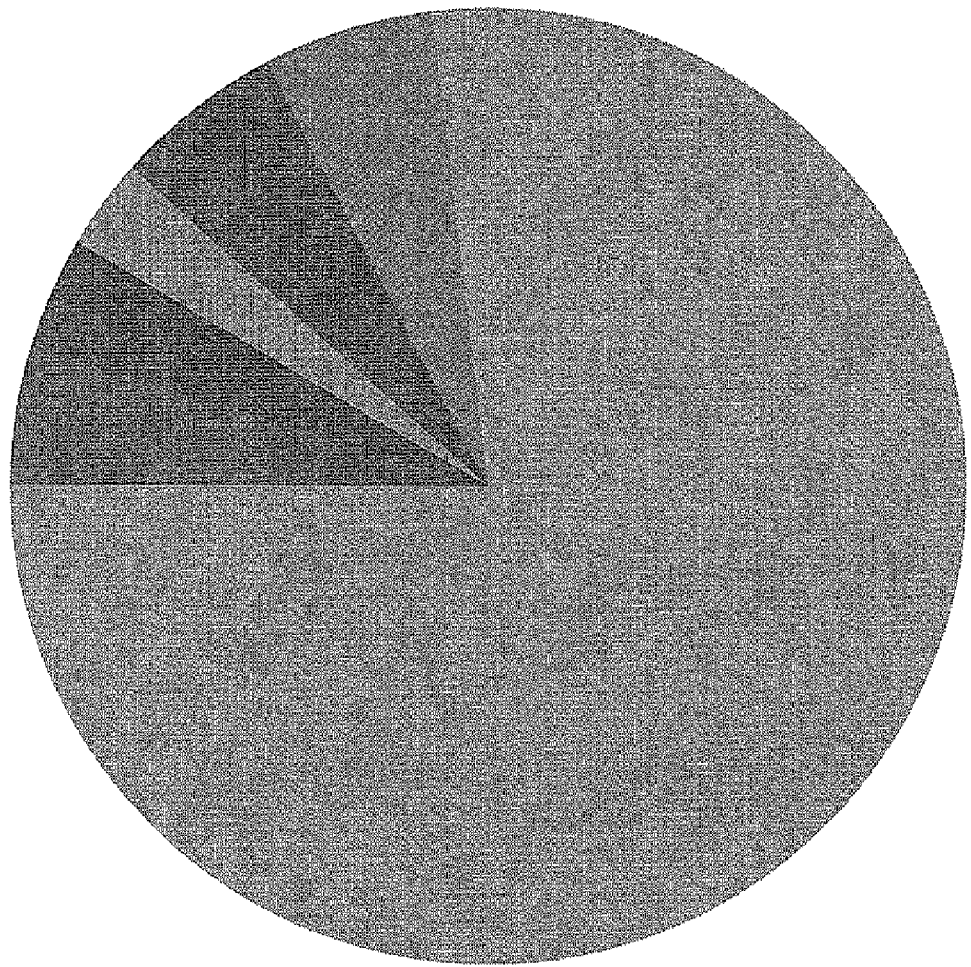
FIG. 5 is a screen shots of an exemplary interface for presenting database performance-data in accordance with aggregate categorized index or table wait time (e.g. categorized according to execution plan).

Discussion of FIG. 5

In the example of FIG. 5B, wait-time of a 'hybrid' object (i.e. a table and its indexes) is classified accordance to 6 categories: "full index access." "write to table access," "table access by . . . " "index skip scan." "index range scan." and 'index overhead' and the 'fraction' of each 'fractional wait time' is shown. A pie chart is provided to represent the relative or fractional contribution of each I/O category to total I/O wait time on the 'hybrid object' of a table and indexes.

Although the non-limiting example of FIG. 5 relates to this 'hybrid object' it is appreciated that the technique may be practices for individual tables and individual indexes as well.

In one example, a pie chart is presented to the user, graphically illustrating the relative contributions of each I/O wait time category to the total I/O wait time for a historical time period.

The DBA can then "drill down" to the cause of why a given object is "heavy" and can tune the database accordingly.

Thus, in one example, it is determined that x % of the total time accessing a table is by using a specific index, where x is a "large" number. Further investigation may indicate that the index has a bad clustering factor, and the table index may be tuned accordingly.

In another example, it may be determined that x % of the total time accessing a table is by "full table/index scan," and it may be recommended to use a better predicate when selecting on the predicate.

Figure 6:
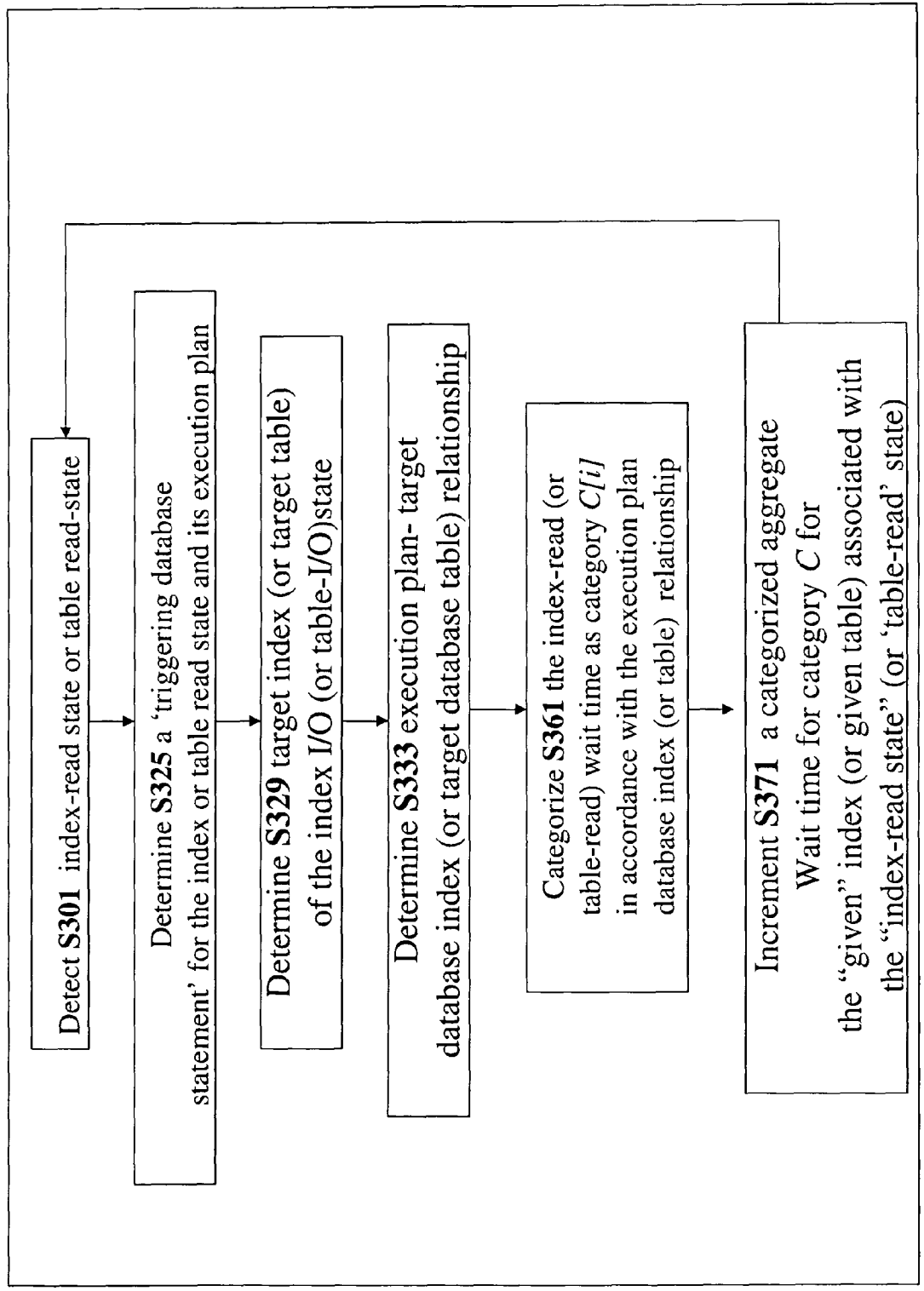

A Discussion of FIG. 6

Reference is now made to FIG. 6. In step S301, it is detected whether or not a given database statement is "waiting" for index I/O or table I/O of a given index or table. This may be done, for example, by accessing 'system data' of the relational database—for example, by reading a system table or by accessing system memory.

In step S325, an identifier or a triggering or 'invoking' database statement is determined. Also, its execution plan (for example, real or estimated) is determined and analyzed.

In steps S239, an identity of target object of the index or table I/O stte is determined.

In step S333 the execution-plan target data index relationship may determined (for example, in accordance with a type of index-I/O or table I/O of the target index or table in the execution plan—full index access, write to table, etc). Thus, in the execution plan, and identifier of the index or table may appear, and it may be possible to determine the 'type of I/O' that is carried out on the table or index.

In step S361, the wait time of the index I/O or table I/O is categorized in accordance with the relationship determined in step S331. In step S371 the appropriate aggregate read time is incremented/A A Discussion of FIG. 7

Figure 7:
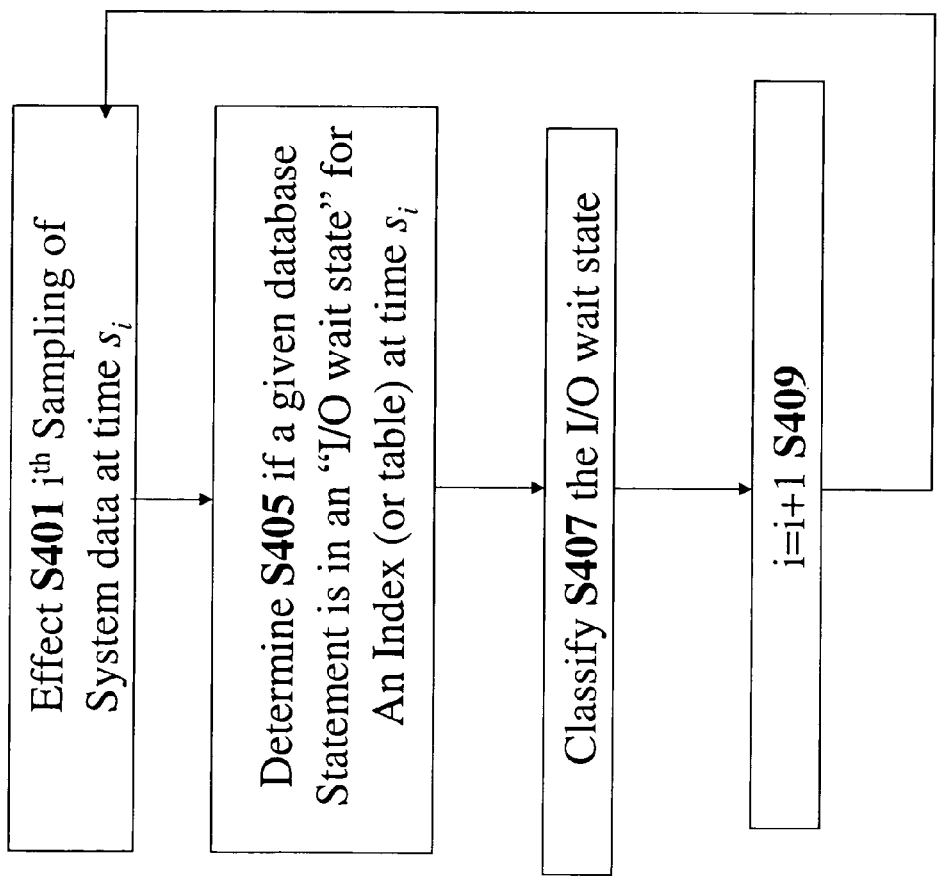

Reference is now made to FIG. 7, which is a flow chart for a technique for tracking "index-read" states and associated wait times in accordance with some embodiments.

In step S401, system data of the database is read (for example, by sampling system memory or by reading or one or more system data structures of the database) for example, repeatedly over a period of time (for example, every second or every ½ second or every two seconds, etc etc). There is no requirement that the rate at which the system data is read remain constant (however, this is indeed possible). In one example, the system data is read a given time, then again 2 seconds later, then again 1 second later, then again 2 seconds later, etc etc.

One example of multiple 'system data sample times' is illustrated at the bottom of FIG. 3, where system data may be read first at time $S_1$, and then at time $S_2$, and then at time $S_3$, etc.

For each sampling (see step S405), it is determined which database items (for example, statements or table or indexes) and are in the object-I/O state.

In addition, it may be possible to quantify an amount of wait time associated with the object I/O state in accordance with a "time gap" between a 'current' sampling time of step S401 $S_i$ and a previous (i.e. the immediate predecessor) sampling time $S_{i-1}$ of step S401 (i.e. a previous execution).

Thus, referring to FIG. 3, to "index-read 1" it is possible to determine an estimated value of an aggregate table IO or index I/O wait time (i.e. whose exact value was given above as $(t_3-t_1)$ as follows:

(i) we start with an aggregate "index-read" time of 0 for index-read 1;

(ii) at sampling time $S_0$, we see that the 'index-read 1' state does not prevail;

(iii) at sampling time $S_1$, we see that 'index-read 1' does prevail—thus we increment the aggregate time by $S_1-S_0$;

(iii) at sampling time $S_2$, we see that 'index-read 1' does prevail—thus we increment the aggregate time by $S_2-S_1$;

(iv) at sampling time $S_3$, we see that 'index-read 1' state does not prevail.

Thus, the total aggregate time of 'index-read 1' may be measured as $S_1-S_0$ which approximates $t_3-t_1$.

This may be carried out for determining index-read wait time all index or table I/O operaitons of FIG. 3 or any other index or table I/O operations—index-read wait time may then be classified as explained herein.

ADDITIONAL DISCUSSION

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb. All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise. The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method for displaying information related to performance of a database during a time interval, the method comprising:
   a) during the time interval, effecting a plurality of index I/O operation or table I/O operation detectings, each index I/O operation or table I/O operation detecting being associated with a respective quantity of wait-time;
   b) for each index I/O or table I/O operation detecting of the plurality of index I/O or table I/O operation detectings:
      i) determining an identity of a respective target index or table for the detected index I/O or table I/O;
      ii) determining an identity and an execution plan of a respective invoking database statement;
      iii) determining a respective database index-execution plan relationship or database table-execution plan relationship between the respective target index and the execution plan of the respective database statement; and
      iv) categorizing, in accordance with the index-execution plan or table-execution plan relationship, the detected table or index I/O operation into an I/O category selected from a plurality of I/O categories;
   c) in accordance with:
      i) the wait-time quantities; and
      ii) the results of the categorization,
      determining, for a particular category of the plurality of I/O categories, for a given index or table of the database and for the time interval, a fractional aggregate index-I/O or table I/O wait time for the particular category, the fractional aggregate index-I/O or table I/O being only a fraction of a total index IO wait time or table I/O wait time for the given index or table for the time interval; and
   d) in accordance with the determine fractional aggregate index-read wait time for at least one of the categories, presenting, to a user, a description of performance of the database during the time period.

2. The method of claim 1 wherein the I/O categories are selected from the group consisting of full index scan, index skip scan, index range scan, table I/O after index I/O and full table scan.

3. The method of claim 1 wherein the execution plans are estimated execution plans.

4. The method of claim 1 wherein the execution plans are real execution plans, the method further comprises:
   e) monitoring the database during the time intervals to detect one or more real execution plans associated with the invoking database statement.

5. The method of claim 1 wherein:
   i) the method further comprises, for a particular category:
      e) determining a ratio between (A) the fractional aggregate index or fractional aggregate table I/O wait time for the given index or table and a given category and a (B) total wait time for the given index or table; and
   ii) the description of the performance of the database during the time period is presented in accordance with the determined ratio.

6. The method of claim 5 wherein the describing of the performance of the database further includes:
   i) displaying a description of the particular category; and
   ii) associating the description of the particular category with the description of the determined ratio.

7. The method of claim 5 wherein:
   i) the method is carried out to determine, for each I/O category of the plurality of I/O categories, a respective aggregate I/O time; and
   ii) the presenting includes presenting, for each I/O category of the plurality of I/O categories, a respective aggregate I/O wait time for said each I/O category;
   iii) the describing includes presenting descriptions of the I/O categories that are associated with respective ration values.

8. A system for displaying information related to performance of a database during a time interval, the method comprising:
   A) a processor operative to:
      a) during the time interval, effecting a plurality of index I/O operation or table I/O operation detectings, each index I/O operation or table I/O operation detecting being associated with a respective quantity of wait-time;
      b) for each index I/O or table I/O operation detecting of the plurality of index I/O or table I/O operation detectings:
         i) determining an identity of a respective target index or table for the detected index I/O or table I/O;
         ii) determining an identity and an execution plan of a respective invoking database statement;
         iii) determining a respective database index-execution plan relationship or database table-execution plan relationship between the respective target index and the execution plan of the respective database statement; and
         iv) categorizing, in accordance with the index-execution plan or table-execution plan relationship, the detected table or index I/O operation into an I/O category selected from a plurality of I/O categories;
      c) in accordance with:
         i) the wait-time quantities; and
         ii) the results of the categorization,
         determining, for a particular category of the plurality of I/O categories, for a given index or table of the database and for the time interval, a fractional aggregate index-I/O or table I/O wait time for the particular category, the fractional aggregate index-I/O or table I/O being only a fraction of a total index IO wait time or table I/O wait time for the given index or table for the time interval; and
   B) a computer screen, in conjunction with the processor, operative, in accordance with the determine fractional aggregate index-read wait time for at least one of the categories, to present, to a user, a description of performance of the database during the time period.

* * * * *